(12) United States Patent
Gaspar et al.

(10) Patent No.: US 12,207,225 B2
(45) Date of Patent: Jan. 21, 2025

(54) HEAD-MOUNTED DEVICE COMMUNICATION ADAPTATION USING ENVIRONMENT CONTEXT

(71) Applicant: Microsoft Technology Licensing, LLC, Redmond, WA (US)

(72) Inventors: Ivan Simoes Gaspar, West Linn, OR (US); Benjamin Eliot Lundell, Seattle, WA (US); Emily Po-Kay Chung, Mountain View, CA (US); Syed Toaha Ahmad, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 350 days.

(21) Appl. No.: 17/703,807

(22) Filed: Mar. 24, 2022

(65) Prior Publication Data

US 2023/0309055 A1 Sep. 28, 2023

(51) Int. Cl.
*H04W 64/00* (2009.01)
*G06T 19/00* (2011.01)
(Continued)

(52) U.S. Cl.
CPC ......... *H04W 64/006* (2013.01); *G06T 19/006* (2013.01); *H04W 4/38* (2018.02); *H04W 56/0035* (2013.01)

(58) Field of Classification Search
CPC ........... H04W 4/02; H04W 4/30; H04W 4/38; H04W 48/02; H04W 48/04; H04W 48/18;
(Continued)

(56) References Cited

U.S. PATENT DOCUMENTS 9,818,225 B2 * 11/2017 Mao ...................... G06T 19/003
10,445,925 B2 * 10/2019 Tokubo ................. G06T 19/006
(Continued)

FOREIGN PATENT DOCUMENTS

WO 2011163057 A1 12/2011
WO 2014163836 A1 10/2014

OTHER PUBLICATIONS

"International Search Report and Written Opinion issued in PCT Application No. PCT/US23/010539", Mailed Date: Apr. 11, 2023, 13 Pages
(Continued)

*Primary Examiner* — Quochien B Vuong
(74) *Attorney, Agent, or Firm* — Workman Nydegger

(57) ABSTRACT

A mechanism for repeatedly adjusting communication with a subject head-mounted device based on a changing real time environment of the subject head-mounted device. By utilizing information about the environment context in which the head-mounted device exists, the optimal parameters may be more quickly determined and with less power. The environment context may be generated from sensors on the head-mounted device itself, or from a proximate sensor device. Thus, the communication properties (such as which protocol to use and what parameters) may be quickly determined in time to be useful to maintain a good connection despite movement of the head-mounted device, and despite the connection being dropped and reestablished. Furthermore, limited battery power is more judiciously utilized.

20 Claims, 8 Drawing Sheets

(51) Int. Cl.
*H04W 4/38* (2018.01)
*H04W 56/00* (2009.01)

(58) Field of Classification Search
CPC . H04W 56/005; H04W 64/00; H04W 64/006; H04W 72/00; H04W 72/02; H04W 72/04; G06T 19/003; G06T 19/006
See application file for complete search history.

(56) References Cited

U.S. PATENT DOCUMENTS

| | | |
|---|---|---|
| 10,713,840 B2 * | 7/2020 | Taylor .................. G06T 19/003 |
| 10,848,902 B2 | 11/2020 | Sponza et al. |
| 11,826,651 B2 * | 11/2023 | Black ..................... G06T 11/60 |
| 2019/0281318 A1 | 9/2019 | Han et al. |

OTHER PUBLICATIONS

Willars, et al., "Enabling Time-Critical Applications over 5G with Rate Adaptation", In White Paper of Ericsson and Deutsche Telekom , May 2021, 21 Pages.

* cited by examiner

HEAD-MOUNTED DEVICE COMMUNICATION ADAPTATION USING ENVIRONMENT CONTEXT

BACKGROUND

From the viewpoint of a user, virtual reality uses devices to replace the physical world with a virtual world. Mixed reality does not entirely replace the physical world from the user's perspective, but instead allows digital objects to co-exist and interact with physical objects in real time. To give the user this perspective, the user typically wears a device on the user's head, so as to provide the user with visual and auditory stimulus to thereby provide the digital objects to the user's senses. Such as device is often termed a "head-mounted device".

The head-mounted device has sensors that permit the device to have context of the real world. Such sensors may include, for example, a variety of cameras. A user who is experiencing mixed reality by wearing the head-mounted device may wander through the real world. As this is happening, the head-mounted device presents digital objects as appropriate to provide the mixed reality experience. Specifically, digital objects are created, removed, or amended as appropriate.

The head-mounted device processes real world context to determine what digital objects to present to the user, as well as where and how to present such digital objects. Such processing can occur locally on the device itself. However, conventional head-mounted devices also communicate digitally with other head-mounted devices or other processing resources. Accordingly, head-mounted devices can have cellular, WiFi and BLUETOOTH® communication capability. Furthermore, to allow for a free moving experience, the head-mounted device is powered by a battery.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In order to experience mixed reality, a user wears a head-mounted device and may often wander through the real world. Furthermore, head-mounted devices may communicate with other entities using communication protocols. Such other entities could include opportunistic sources of memory and processing. However, communication may become disrupted precisely because of the movement of the user through the real world, and because communication is dropped and reestablished to preserve battery power on the head-mounted device.

Determining optimal parameters for communication is a cumbersome process, particularly between a cellular base station and a client, such as a head-mounted device. Conventionally, this may be done by brute force—sweeping through the domain of possible parameters, and then choosing the parameters that worked the best. However, a head-mounted device moves to facilitate the mixed reality experience, and thus previously selected parameters for communication may quickly become unsuitable. Furthermore, the head-mounted device may drop and reestablish communication in order to save battery power.

The principles described herein provide a mechanism for repeatedly adjusting communication with a subject head-mounted device based on a changing real time environment of the subject head-mounted device. By utilizing information about the environment context in which the head-mounted device exists, the optimal parameters may be more quickly determined and with less power. Relevant information is accordingly used to get a head start on selecting the best communication properties to use (such as which network type, which network, and what network parameters). The environment context may be generated from sensors on the head-mounted device itself, or from a proximate sensor device. Accordingly, the environment context is very accurate. Thus, the communication properties to use may be quickly determined in time to be useful to maintain a good connection despite movement of the head-mounted device, and despite the connection being dropped and reestablished. Furthermore, limited battery power is more judiciously utilized.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In order to experience mixed reality, a user wears a head-mounted device and may often wander through the real world. Furthermore, head-mounted devices may communicate with other entities using communication protocols. Such other entities could include opportunistic sources of memory and processing. However, communication may become disrupted precisely because of the movement of the user through the real world, and because communication is dropped and reestablished to preserve battery power on the head-mounted device.

Determining optimal parameters for communication is a cumbersome process, particularly between a cellular base station and a client, such as a head-mounted device. Conventionally, this may be done by brute force—sweeping through the domain of possible parameters, and then choosing the parameters that worked the best. However, a head-mounted device moves to facilitate the mixed reality experience, and thus previously selected parameters for communication may quickly become unsuitable. Furthermore, the head-mounted device may drop and reestablish communication in order to save battery power.

The principles described herein provide a mechanism for repeatedly adjusting communication with a subject head-mounted device based on a changing real time environment of the subject head-mounted device. By utilizing information about the environment context in which the head-mounted device exists, the optimal parameters may be more quickly determined and with less power. Relevant information is accordingly used to get a head start on selecting the best communication properties to use (such as which network type, which network, and what network parameters). The environment context may be generated from sensors on the head-mounted device itself, or from a proximate sensor device. Accordingly, the environment context is very accurate. Thus, the communication properties to use may be quickly determined in time to be useful to maintain a good connection despite movement of the head-mounted device, and despite the connection being dropped and reestablished. Furthermore, limited battery power is more judiciously utilized.

Figure 1:
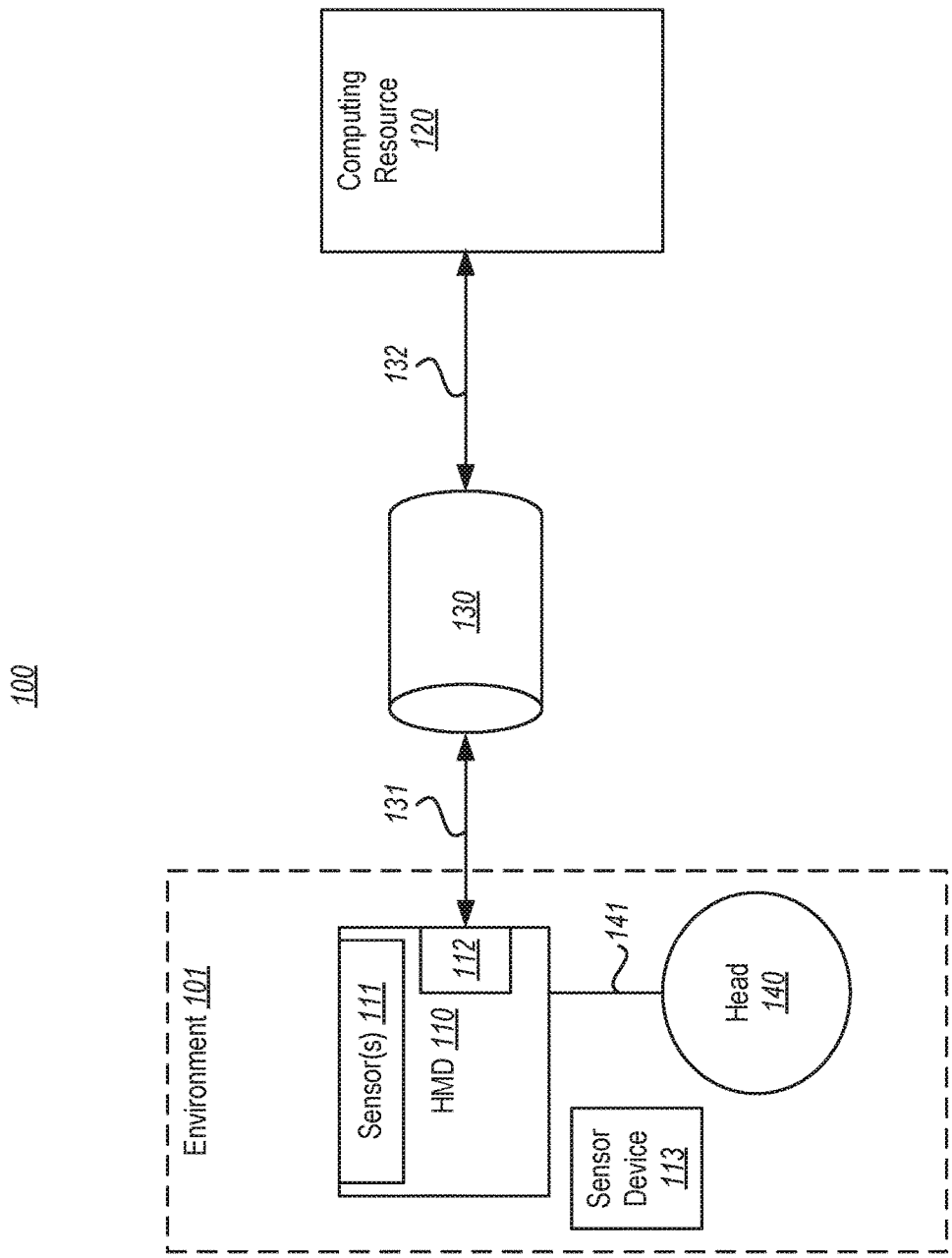
FIG. 1 illustrates a network environment in which the principles described herein may be employed, and that includes a head-mounted device communicating over a communication channel with a computing resource.

FIG. 1 illustrates a network environment 100 that includes a head-mounted device 110 communicating (as represented by bi-directional arrows 131 and 132) over a communication channel 130 with a computing resource 120. The head-mounted device 110 includes a communication component 112 to facilitate such communication. As an example, the head-mounted device 110 may communicate over a cellular, WIFI™, BLUETOOTH® network, or any other networks, or any combination of networks. The computing resource 120 represents an opportunistic source of processing and/or memory for the head-mounted device 110.

The head-mounted device 110 is securely positioned (as represented by line 141) on a head 140 of a user experiencing a mixed reality experience via the head-mounted device 110. As an example only, the head-mounted device 110 may be a helmet, glasses or any other form-factor that illuminates an image into the eye of the user and/or sound into the ear of the user. The head-mounted device 110 may act as a computing system. Accordingly, the head-mounted device may be structured as described below for the computing system 800 of FIG. 8. In this case, the communication component 112 may be structured as described below for the executable component 806 of FIG. 8.

Figure 2:
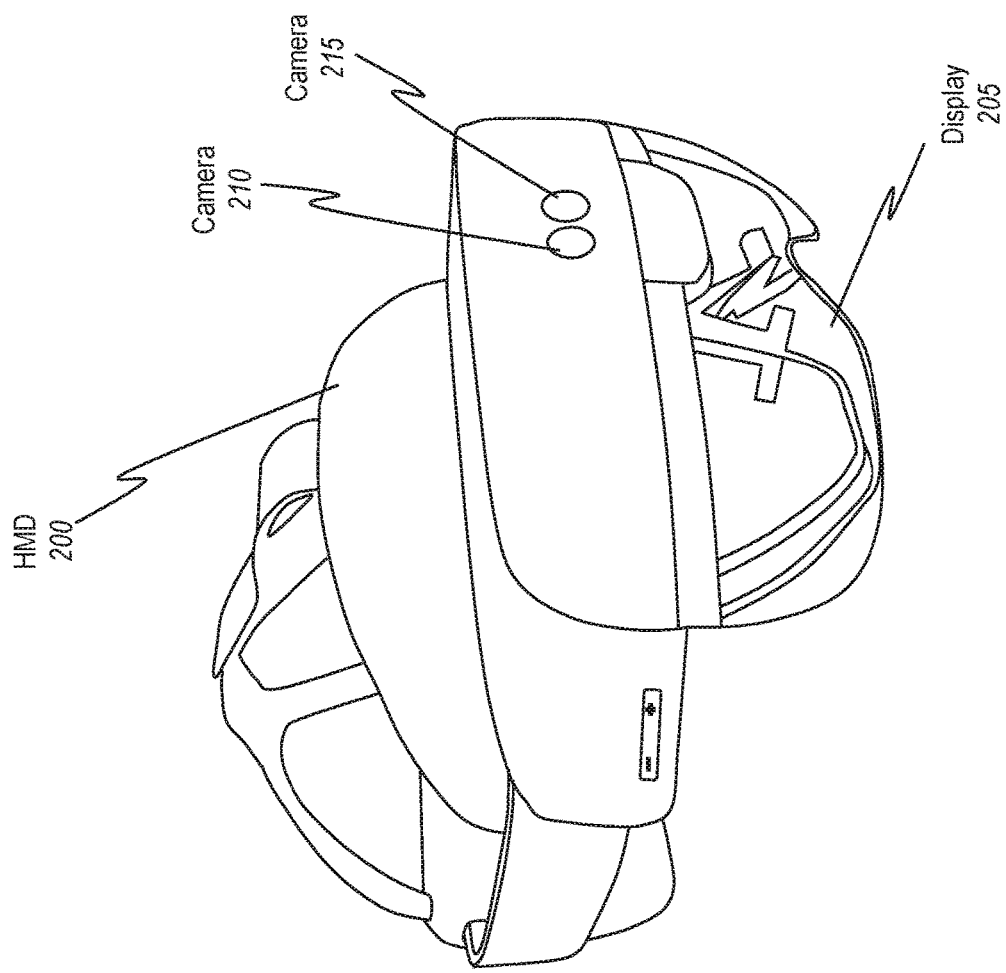
FIG. 2 illustrates a head-mounted device that represents an example of the head-mounted device of FIG. 1.
Figure 3:
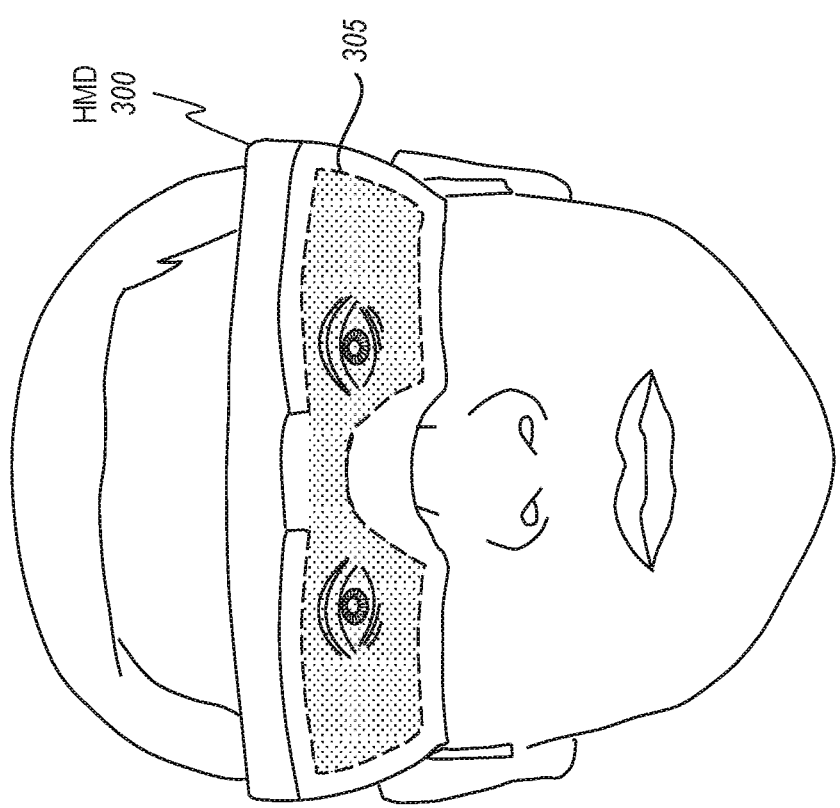
FIG. 3 illustrates another head-mounted device that represents an example of the head-mounted device of FIG. 1.

FIG. 2 illustrates a head-mounted device 200 that represents a mere example of the head-mounted device 110 of FIG. 1. The head-mounted device 200 illuminates images into the eye of the user using the display 205. FIG. 3 illustrates a head-mounted device 300 that represents another example of the head-mounted device 110 of FIG. 1. The head-mounted device 300 illuminates images into the eye of a user using the display 305. The head-mounted devices 200 and 300 are merely a few examples of a countless variety of head-mounted devices that could be used consistent with the principles described herein. The principles described herein are not limited to the form factor of the head-mounted device.

Returning to FIG. 1, the user and the head-mounted device 110 are positioned within a real time environment 101. The head-mounted device 110 includes sensor(s) 111 that sense the real time environment 101. In the example head-mounted device 200 of FIG. 2, the head-mounted device 200 includes cameras 210 and 215 that take in images of the surrounding environment 101. Alternatively, or in addition, there may be a separate sensor device 113 within the environment 101 that also assists in generating environment context for the head-mounted device 110. As an example, the sensor device 113 could be another head-mounted device within the environment 101.

The real time environment 101 of the head-mounted device 110 dynamically changes over time as the user is engaged in a mixed reality experience. In accordance with the principles described herein, communication over the communication channel 130 with the head-mounted device 110 is repeatedly adjusted based on a changing real time environment 101 as sensed by the sensor(s) 111.

Figure 4:
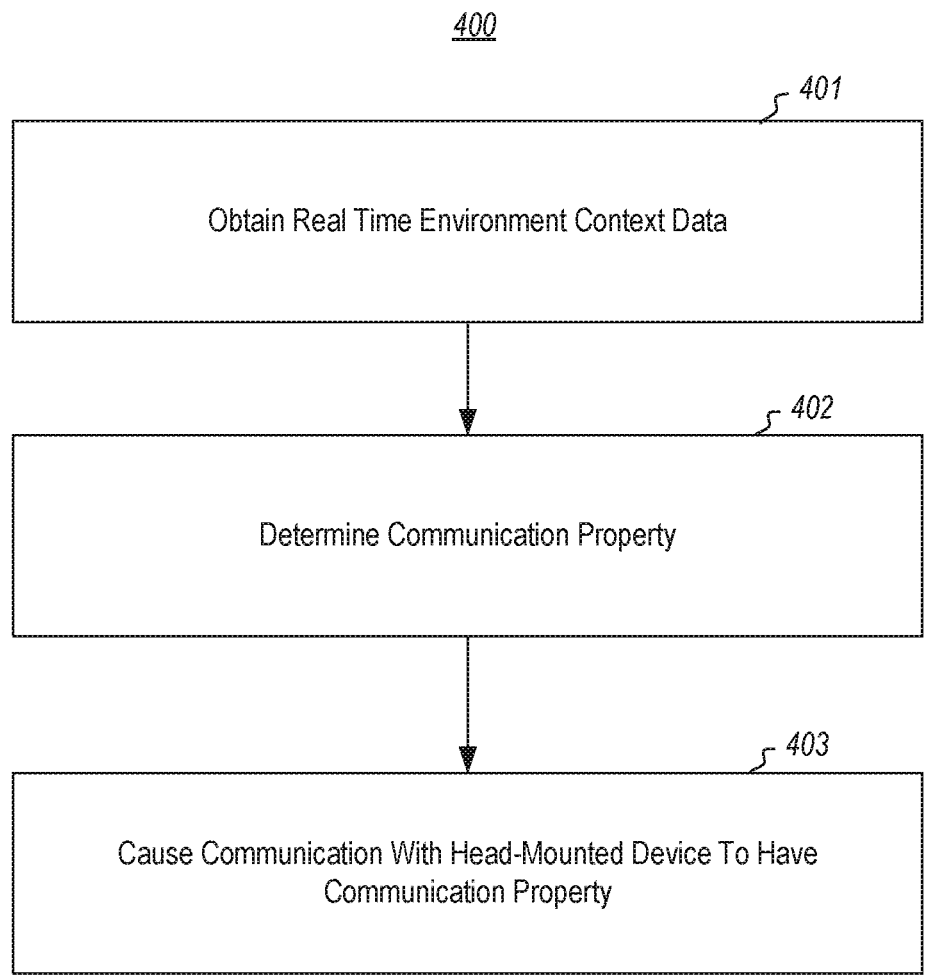
FIG. 4 illustrates a flowchart of a method for adjusting communication with a subject head-mounted device based on a changing real time environment of the subject head-mounted device, in accordance with the principles described herein.
Figure 5:
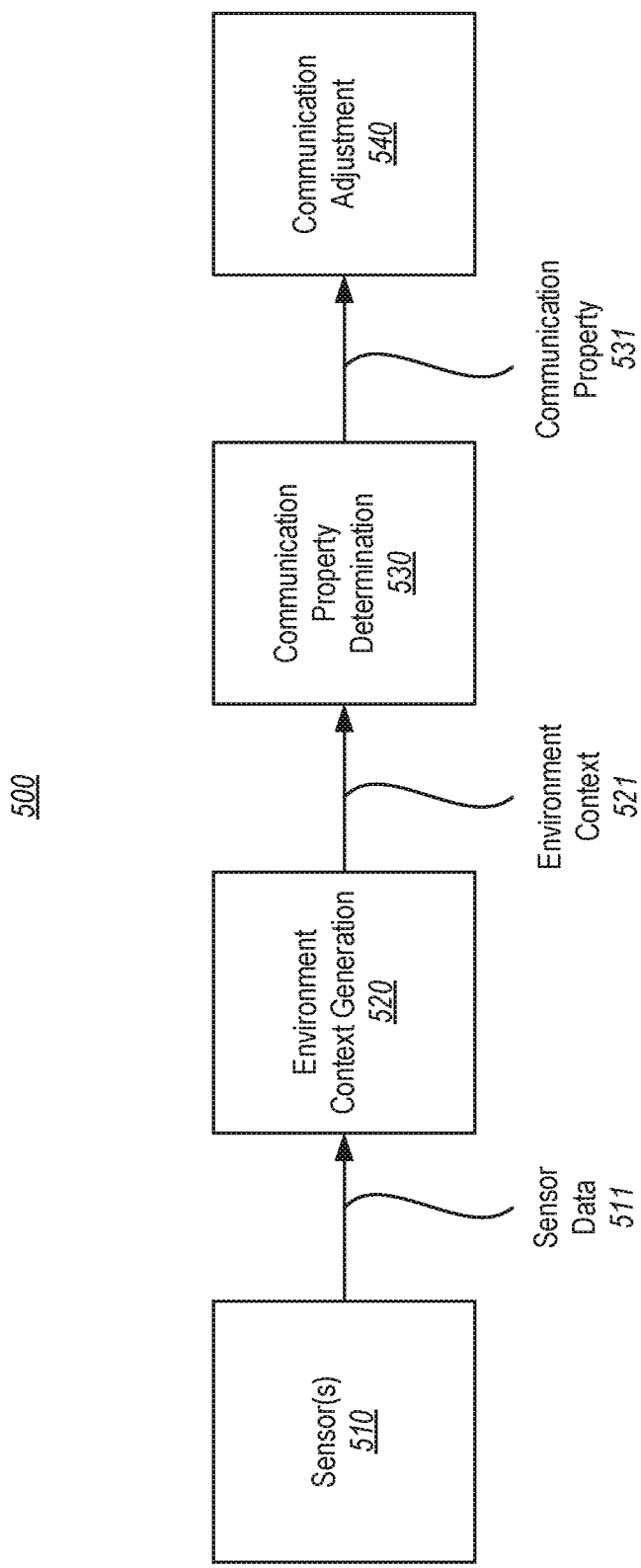
FIG. 5 illustrates a data flow associated with the method of FIG. 5.

Accordingly, FIG. 4 illustrates a flowchart of a method for adjusting communication with a subject head-mounted device based on a changing real time environment of the subject head-mounted device. The method 400 may be repeatedly performed so as to repeatedly adapt to a changing environment. FIG. 5 illustrates a data flow 500 associated with the method 500. Accordingly, the method 400 of FIG. 4 will be described with frequent reference to the data flow 500 of FIG. 5.

In accordance with the method 400, real time environment context data is obtained from sensor data generated by one or more sensors of a sensor device (act 401). As an example, referring to FIG. 5, sensor(s) 510 generate sensor data 511, which is then fed into environment context generation component 520. The environment context generation component 520 then generates the environment context 521 based on the sensor data 511.

Returning to FIG. 4, the method 400 includes determining a communication property to be used in communicating with a subject head-mounted device based on the real time environment context data (act 402). As an example, referring to FIG. 5, a communication property determination component 530 receives the environment context 521 and determines a communication property 531 based on the environment context 521.

Returning to FIG. 4, the method 400 includes causing communication with the subject head-mounted device to be adjusted using the determined communication property (act 403). As an example, referring to FIG. 5, a communication adjustment component 540 receives the communication property 531 and adjusts the communication in accordance with the communication property.

If the data flow 500 is implemented by a computing system, such as the computing system 800 described below with respect to FIG. 8, each of the environment context generation component 520, the communication property determination component 530, and the communication adjustment component 540 may be structured as described for the executable component 806 of FIG. 8.

Not all of the data flow 500 need be implemented on the same computing system. As an example, the environment context generation component 520 may be performed on the same computing system in which the sensor(s) 510 are located, although that need not be the case. The environment context generation component 520 may be implemented on a different computing system, such as in a cloud computing environment. For instance, referring to FIG. 1, the environment context generation component 520 may be implemented on the computing resource 120. In that case, the sensor data would be transmitted from the sensor device 113 to the computing resource 120. This configuration would permit for more complex processing than might otherwise be available within the sensor device 113. As an example, the environment context generation component 520 may generate the environment context using complex rules, machine-learning networks, or a combination thereof. This would allow for accurate environment context to be obtained.

So environment context generation component 520 need not be on the same computing system in which the sensor(s) 510 are located. In addition, the communication property determination component 530 may likewise be located either on the same computing system as the sensor(s) 510 are located, or a different computing system than the sensor(s) are located. For instance, the communication property determination component 530 may be implemented in a cloud computing environment. This configuration would permit for more complex processing than might otherwise be available within the sensor device 113. As an example, the communication property determination component 520 may generate the environment context using complex rules, machine-learning networks, or a combination thereof. This would allow for refined determination of a suitable communication property.

The communication adjustment component 540 may be the communication component 112 on the head-mounted device 110, a communication component on the computing resource 120 that interfaces with the communication channel 130, or a combination. Each of the acts will now be further described with respect to particular examples.

The method 400 includes an act of obtaining real time environment context data from sensor data generated by one or more sensors of a sensor device (act 401). The sensor device could be situated on the head-mounted device itself. As an example, referring to FIG. 1, the sensor data may be generated by the sensor(s) 111 on the head-mounted device 110 itself.

Figure 6:
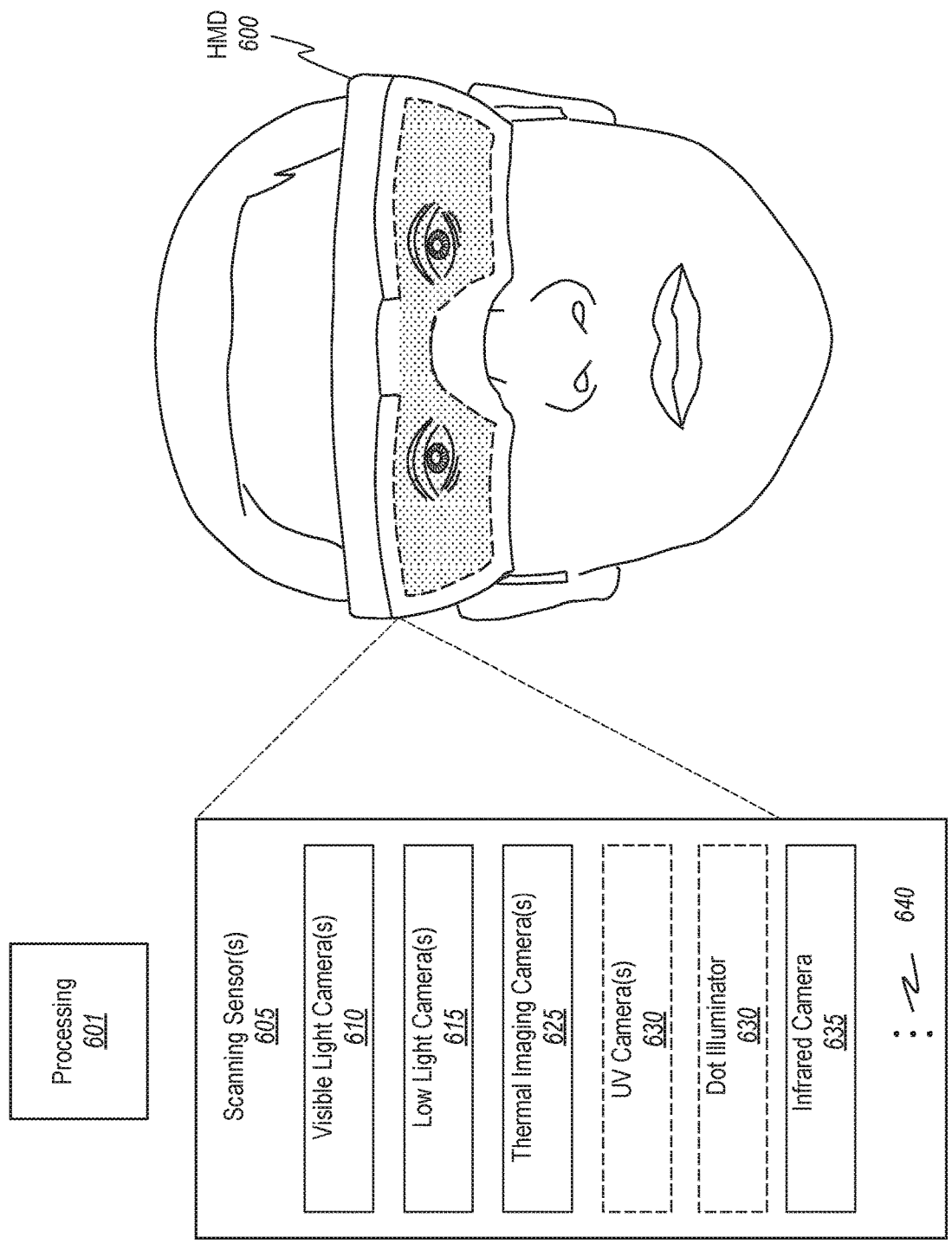
FIG. 6 illustrates a head-mounted device that is similar to the head-mounted device of FIG. 3, except that sensor(s) that are on the head-mounted device are further enumerated.

For example, FIG. 6 illustrates a head-mounted device 600 that is similar to the head-mounted device 300 of FIG. 3, except that sensor(s) 605 that are on the head-mounted device 600 are further enumerated. Such sensor(s) 600 are examples of the sensors 111 of FIG. 1, and include visible light camera(s) 610, low light camera(s) 615, thermal imaging camera(s) 620, ultraviolet camera(s) 625, a dot illuminator(s) 630, infrared camera(s) 635, and so forth. The ellipsis 640 represents that the head-mounted device 600 may include any subset of these cameras and may potentially include other sensors as well. A head-mounted device 600 can thus be very well equipped to sense its environment.

The head-mounted device 600 is also illustrated as having some associated on-board processing 601.

The real time environment context data could include, for instance, an absolute position of the head-mounted device, an orientation of the head-mounted device and/or a direction of movement of the head-mounted device. The real time environment context data could also include a predicted future position, orientation, and/or direction of the head-mounted device. The real time environment context data could include a descriptive position, orientation or direction of the head-mounted device. For instance, the environment context data could be that the head-mounted device is currently outside, currently inside, is moving towards an entryway or exit, is proximate a certain number of other head-mounted device, is heading towards other head-mounted devices, and any other information about the environment in which the head-mounted device appears. Each of these pieces of information are relevant to which communication properties should be used when communicating with the head-mounted device. Accordingly, each of these pieces of information, either individuals or especially collectively, allows for accurate determination of appropriate communication properties to use in communicating with the head-mounted device.

The principles described herein are not limited to the particular type of real time environment context information that is obtained from the sensor(s). Furthermore, the principles described herein are not limited to the type of sensors that are used to generate sensor data from which the environment context data is obtained. In one example, the sensor data is generated by the sensor(s) on the head-mounted device itself. Alternatively, or in addition, the sensor data may be generated by another sensor device (e.g., sensor device 113) that is not located on the actual head-mounted device for which environment context data is calculated. As an example, another head-mounted device may be used to help determine that a particular head-mounted device is about to head outside.

The principles described herein are also not limited to where the environment context data is actually generated. For instance, the environment context data may be generated by the on-board processing (e.g., on-board processing 601 of the head-mounted device of FIG. 6) that is on a head-mounted device, such as the head-mounted device for which environment context data is being determined. Alternatively, or in addition, the environmental context data may be determined remotely. For example, referring to FIG. 1, sensor data may be provided from a head-mounted device 110 over the actual channel 130 to have processing on the computing resource 120 generate the actual environment context data. Accordingly, the generation of sensor data and the obtaining of environment context data may be distinctly performed, and may even be performed by different network nodes.

Based on the real time environment context data, a communication property is determined, which is to be used in communicating with a subject head-mounted device based on the real time environment context data (act 402). The communication property may be any property which may be adjusted to allow for better communication between the head-mounted device (e.g., the head-mounted device 110 of FIG. 1) and the computing resource (e.g., the computing resource 120 of FIG. 1).

Examples of such a communication property include the actual type of communication network to be used in communication with the subject head-mounted device. For instance, communication channel 130 itself could be selected so as to be cellular, WIFI™, BLUETOOTH®, or any other available network. Then, given that network, appropriate further communication properties may be determined. As an example, regardless of the type of network being used, a communication property could include a scheduling scheme to be used.

In the case of the communication channel 130 being a cellular network, such as a 5G cellular network, appropriate properties for further selection could include an encoding scheme of the cellular network, a modulation scheme of a cellular network to be used in communicating with the subject head-mounted device, an error correction to be used in communicating with the subject head-mounted device, and so forth. Appropriate selection of any, and potentially multiple, of the communication properties would allow for rapid optimization of communication of the cellular network.

The environment context data need not be limited to the current environment context in which the head-mounted device exists, but may also be an anticipated environment context in which the head-mounted device may very soon exist. This is because what the sensor(s) of a head-mounted device sees is indicative of the intent of movement of the user.

Figure 7:
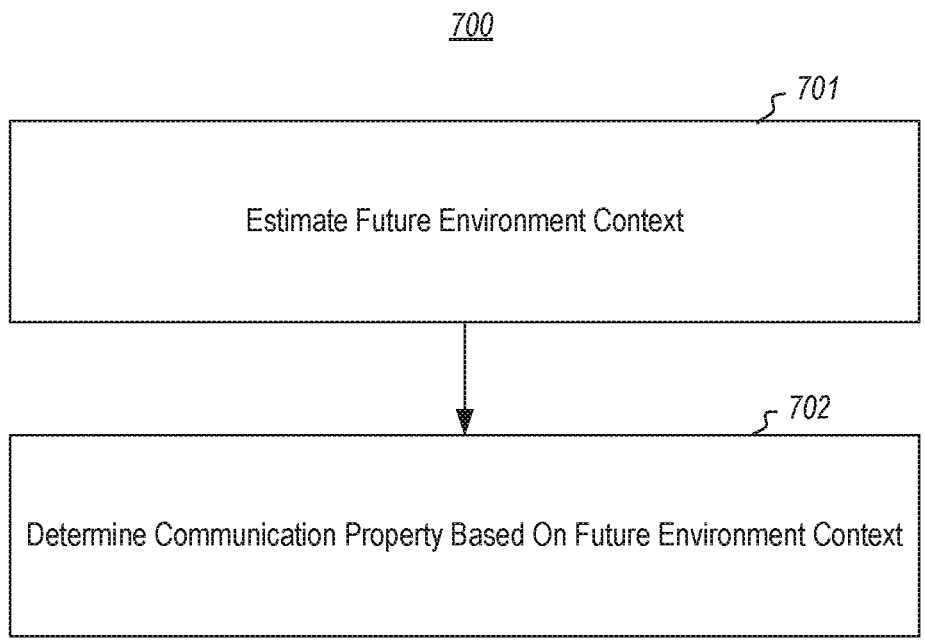
FIG. 7 illustrates a flowchart of a method for determining a communication property to be used in communicating with the subject head-mounted device based on the real time environment context data.

FIG. 7 illustrates a flowchart of a method 700 for determining a communication property to be used in communicating with the subject head-mounted device based on the real time environment context data. The method 700 represents an example of the act 402 of FIG. 4. The method 700 includes estimating a future environment context (e.g., position, movement, orientation, etc.) of the head-mounted device based on the current environment context data (act 701). The method 700 then includes determining the communication property based on the estimated future environment context of the head-mounted device. Thus, the principles described herein allow for refined prediction of future optimal communication parameters leveraging what the sensors indicate may be the intent of the wearer of the head-mounted device.

Because the principles described herein are performed in the context of a computing system, some introductory discussion of a computing system will be described with respect to FIG. 8. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
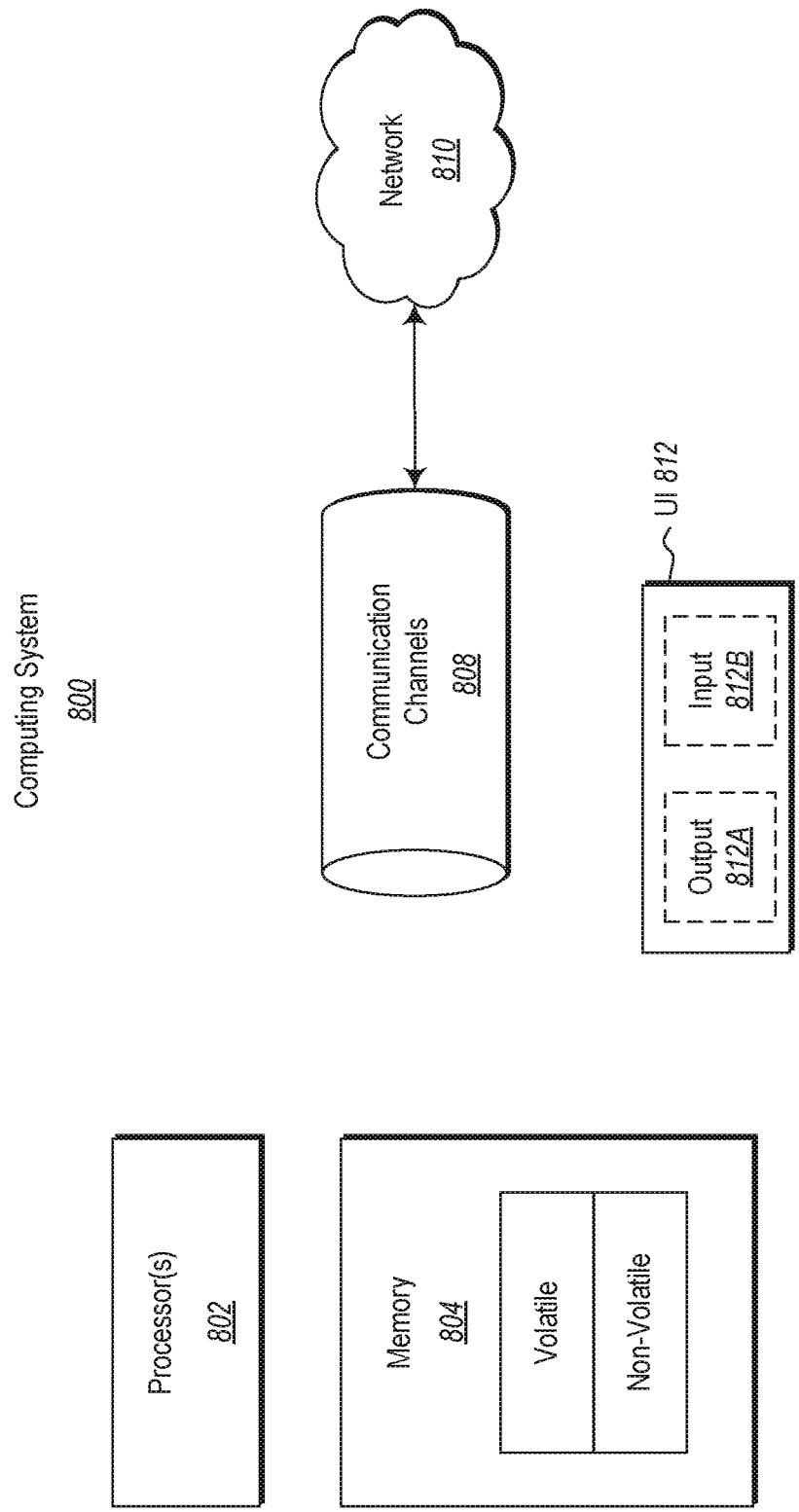
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that repeatedly adjusts communication with a subject head-mounted device (HMD) based on a changing real time environment of the subject HMD, the computing system comprising:
one or more processors; and
one or more hardware storage devices that store instructions that are executable by the one or more processors to cause the computing system to:
access real time environment context data obtained from sensor data generated by a sensor, wherein the real time environment context data includes one or more of an orientation of the subject HMD or a predicted orientation of the subject HMD;
determine a communication property to be used in communicating with the subject HMD based on the real time environment context data; and
change or reestablish a communication protocol used between the subject HMD and an external device, said change or reestablishment being based on the determined communication property, such that changing or reestablishing the communication protocol is based on the one or more of the orientation of the subject HMD or the predicted orientation of the subject HMD.

2. The computing system of claim 1, the communication property being a communication network to be used in communicating with the subject HMD.

3. The computing system of claim 1, the communication property being an encoding scheme of a cellular network to be used in communicating with the subject HMD.

4. The computing system of claim 1, the communication property being a modulation scheme of a cellular network to be used in communicating with the subject HMD.

5. The computing system of claim 1, the communication property being an error correction to be used in communicating with the subject HMD.

6. The computing system of claim 1, the communication property being a scheduling scheme to be used in communicating with the subject HMD.

7. The computing system of claim 1, wherein the determination of the communication property to be used in communicating with the subject HMD based on the real time environment context data comprises:
estimating a future position of the subject HMD based on the environment context data; and
determining the communication property based on the estimated future position of the subject HMD.

8. The computing system of claim 1, the real time environment context data includes an absolute position of the subject HMD.

9. The computing system of claim 1, the real time environment context data includes a descriptive position of the HMD.

10. The computing system of claim 1, the computing system comprising the subject HMD.

11. The computing system of claim 1, the subject HMD comprising the sensor.

12. The computing system of claim 1, the sensor being included in another HMD.

13. The computing system of claim 1, the communication property including one or more networks to be used in communicating with the subject HMD.

14. A method for repeatedly adjusting communication with a subject head-mounted device (HMD) based on a changing real time environment of the subject HMD, the method comprising:
accessing real time environment context data obtained from sensor data generated by a sensor, wherein the real time environment context data includes one or more of an orientation of the subject HMD or a predicted orientation of the subject HMD;
determining a communication property to be used in communicating with the subject HMD based on the real time environment context data; and
changing or reestablishing a communication protocol used between the subject HMD and an external device, said change or reestablishment being based on the determined communication property, such that changing or reestablishing the communication protocol is based on the one or more of the orientation of the subject HMD or the predicted orientation of the subject HMD.

15. The method of claim 14, the communication property being a communication network to be used in communicating with the subject HMD.

16. The method of claim 14, the determination of the communication property to be used in communicating with the subject HMD based on the real time environment context data comprising the following:
estimating a future position of the subject HMD based on the environment context data; and
determining the communication property based on the estimated future position of the subject HMD.

17. The method of claim 14, the real time environment context data being an absolute position of the subject HMD.

18. The method of claim 14, the real time environment context data being a descriptive position of the HMD.

19. The method of claim 14, wherein a movement of a user wearing the subject HMD causes a disruption that is reflected in the real time environment context data, and wherein the communication protocol is changed or reestablished based on the disruption.

20. One or more hardware storage devices that store instructions that are executable by one or more processors to cause the one or more processors to:
access real time environment context data obtained from sensor data generated by a sensor, wherein the real time environment context data includes one or more of an orientation of the subject HMD or a predicted orientation of the subject HMD;
determine a communication property to be used in communicating with the subject HMD based on the real time environment context data; and
change or reestablish a communication protocol used between the subject HMD and an external device, said change or reestablish being based on the determined communication property, such that changing or reestablishing the communication protocol is based on the one or more of the orientation of the subject HMD or the predicted orientation of the subject HMD.

* * * * *